United States Patent
Mastursi et al.

[15] 3,681,354
[45] Aug. 1, 1972

[54] DIBENZO(B,F)OXEPIN-AND THIEPIN-10-YL COMPOUNDS

[72] Inventors: Michele Mastursi, Naples; Sabino Lembo, Pozzuoli; Rene Viterbo, Naples, all of Italy

[73] Assignee: Richardson-Merrell S.p.A., Naples, Italy

[22] Filed: Nov. 17, 1970

[21] Appl. No.: 90,488

Related U.S. Application Data

[63] Continuation-in-part of Ser. No. 715,535, March 25, 1968, Pat. No. 3,600,391.

[30] Foreign Application Priority Data

March 28, 1967 Italy..................35729 A/67

[52] U.S. Cl..........................260/268 TR
[51] Int. Cl..............................C08d 51/70
[58] Field of Search..................260/268 TR

[56] References Cited

UNITED STATES PATENTS 3,600,391  8/1971  Mastursi et al. ........260/268 TR

OTHER PUBLICATIONS

Vmio et al. in Chem. Abstr. Vol. 71, Col 11 2976v (1969)

*Primary Examiner*—Donald G. Daus
*Attorney*—Eugene O. Retter and George W. Ruchfuss, Jr.

[57] ABSTRACT

New compounds having the following general formula:

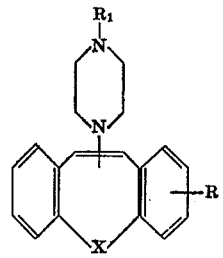

in which X is = O, or = S; and R, and $R_1$ are a variety of substitutents. The compounds have useful pharmacological activities which include hypertensive, sedative, muscle relaxant, local anesthetic, analgesic, anti-pyretic, and anti-inflammatory activities. Various salts of these compounds are also useful and are included within the scope of the present invention. Processes of preparing these compounds are described.

12 Claims, No Drawings

DIBENZO(B,F)OXEPIN- AND THIEPIN-10-YL COMPOUNDS

This application is a continuation-in-part of applicants' copending application Ser. No. 715,535, filed Mar. 25, 1968 and now U.S. Pat. No. 3,600,391, issued Aug. 17, 1971.

This invention relates to new and useful en-amines characterized by having the following general formula:

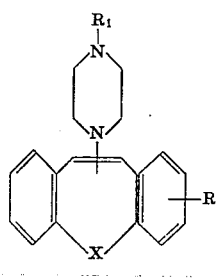

in which X is -O, or -S; R is hydrogen, halogen, lower alkoxy, lower alkyl, amino, nitro, monoalkylamino, dialkylamino, trifluoromethyl, sulfonyl, or sulfonylamide; and $R_1$ is hydrogen, lower alkyl, phenyl, phenethyl, benzyl, benzoyl, carbalkoxy, carbalkoxyalkyl, phenacyl, alkylacetamide, dialkylacetamide, alkylcarboxamide, phenylcarboxamide, halophenylcarboxamide, phenylthiocarboxamide, cyanoethyl, picolyl, dialkylaminoalkyl, cyclopropylmethyl, allyl, or propargyl.

The acid addition salts of these new compounds as well as the oxonium, and sulfonium, and the sulfoxides and sulfones of those having a sulfur atom are included within the scope of the present invention.

En-amines are peculiar compounds and are, therefore, considered as a separate class of nitrogen-containing compounds and not as simple amine derivatives. Detailed reviews are devoted to en-amines [see for instance Szmuszkowicz, J., Enamines, pages 1 to 110 in: Raphael, R.A., Taylor, E.C., and Wynberg, H., Advances in Organic Chemistry: Methods and Results, Volume 4, Interscience Publishers, New York (1963)] in which structure as well as reactivity of these compounds are described.

En-amines such as those of the present invention easily undergo hydrolytic cleavage in acidic medium resulting in formation of a keto compound and the split-off amine grouping. However, some of these ketones are devoid of pharmacological activity from which it would appear that the compounds are not metabolized in vivo to the ketone but are transformed in some other way. Another peculiar property of en-amines is the ease with which they can be alkylated or acylated. Such alkylation and acylation could be a preliminary step in the metabolic fate of the compounds of the present invention.

The new compounds of the present invention are useful primarily because of their pharmacological activities which include anti-hypertensive, sedative, muscle relaxant, local anesthetic, analgesic, antipyretic, and anti-inflammatory activities as will be more specifically pointed out below.

The most pertinent prior art known to applicants is the publication by W. Tochtermann et al., Ber. 97, 1318 (1964). The Tochtermann et al. publication describes the synthesis of piperidine but not piperazine derivatives, however. Belgian Pat. No. 678,483 issued recently to Rhone-Poulenc on dibenzocycloheptatriene derivatives describes certain en-amines which, however, are carbocyclic and do not have oxygen or sulfur atoms as represented by X in the formula above. It is obvious from theoretical considerations as well as observed pharmacological properties that the presence of a hetero atom in the three ring structure changes the geometric shape of the molecule and the reactivity of the same. It is also known that oxygen and sulfur atoms can form oxonium, sulfonium, and other salts and may be expected to be pharmacologically different in their activities from those compounds having no hetero oxygen or sulfur atoms.

The new compounds of the present invention may be prepared by the method of Tochtermann et al. (Method A) or by treating the desired 10-keto derivative with a desired piper-azine in a water non-miscible aprotic solvent or in an excess of the organic cyclic nitrogen base (Method B). In addition, the piperazine derivatives may be alkylated, arylated, or acylated to form further derivatives (Method C).

More particularly, Method A is carried out as follows: To a solution of potassium tertiary butylate prepared in situ from potassium and anhydrous tertiary butyl alcohol or the equivalent amount of a suitable base, such as sodium amide, potassium or sodium alcoholate or a tertiary organic base, such as triethylamine, alkylpiperidine or a base of the anionic ion exchange type dissolved or suspended in a sufficient amount of anhydrous ethyl ether or other non-polar solvent, such as dioxane, aromatic, alicyclic or aliphatic hydrocarbon, such as benzene, toluene, cyclohexane, hexane or pentane, is added a solution in a non-polar solvent of the desired unsaturated halogen derivative (chloro or bromo derivative) of the formula:

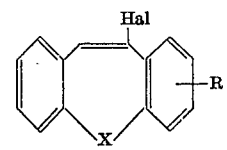

To this solution is added the solution of a desired piperazine base dissolved in the suitable non-polar anhydrous solvent, such as ethyl ether, dioxane, aromatic, alicyclic or aliphatic hydrocarbon.

The molar ratio between the base, halogen derivative, and piperazine base can be considerably varied depending on the reactivity of the various compounds involved in the reaction, as can be seen from the examples. The above mixture is allowed to react at a temperature between room temperature and boiling point of the solvent in a period of time between three and 24 hours. The reaction mixture is then partitioned in the usual manner between water and a water-immiscible organic solvent, such as ethyl ether, toluene, benzene, or ethyl acetate, chloroform or other. The organic layer is evaporated and the residue is crystallized from a suitable solvent, such as ethyl acetate, ethanol, methanol, or other, yielding the pure reaction product.

The process of Method B is carried out as follows: An enolizable keto derivative of the formula:

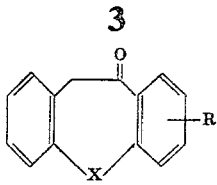

together with the piperazine base is dissolved in a suitable amount of anhydrous benzene or toluene or other, with water non-miscible, aprotic solvent or in an excess of the piperazine base and refluxed with the simultaneous elimination of the water formed during the reaction for a period of time between 24 and 100 hours in the presence of a Lewis acid such as p-toluenesulfonic acid, or the salt of a strong mineral acid with a weak organic base such as piperazine hydrochloride or other. After the end of the reaction, the solution is partitioned between water and a water insoluble solvent, such as ethyl ether, ethyl acetate, benzene, toluene, chloroform, or other. The organic phase is concentrated and the residue is crystallized from a suitable solvent, such as methanol, ethanol, ethyl acetate or other yielding the pure crystalline compound.

Further derivatives are prepared by Method C as follows: To the N-substituted piperazine derivative, wherein $R_1$ is hydrogen, prepared as described above dissolved in an anhydrous aprotic solvent, such as benzene, toluene, or other aromatic or aliphatic hydrocarbon or ethyl ether, is added the alkylating, arylating, or acylating agent if necessary in the presence of a suitable base, such as anhydrous sodium carbonate or bicarbonate, or other basic alkali metal salt or alcoholate or organic tertiary nitrogen base, such as pyridine, alkyl-piperidine, triethylamine or anionic ion exchange resin. The reaction temperature can be chosen in the range from 0° C. to boiling temperature of the solvent and the reaction time is between one hour and 24 hours, depending on the reactivity of the compounds involved in the reaction. The reaction mixture is extracted with a water non-miscible solvent, such as ethyl ether, ethyl acetate, benzene, toluene, chloroform or other. The organic layer is concentrated and the residue crystallized from a suitable solvent, such as benzene, methanol, or ethylacetate.

The invention will now be illustrated by examples showing the preparation of a number of the compounds of the present invention by means of the several methods mentioned above.

EXAMPLE I

N-[Dibenzo(b,f)oxepin-10-yl]-N'-methylpiperazine 29 grams (138 mmol) Dibenzo(b,f)oxepin-10(11H)-one[11] Known compound: See Shoshichiro Kimoto et al. J. Pharm. Soc. Japan 74, 426 (1954) C.A. 49, 5374b (1955), 29 grams (290 mmol) N-methylpiperazine, and 0.5 gram p-toluenesulfonic acid monohydrate were dissolved in 100 milliliters of anhydrous toluene. The solution was refluxed for 71 hours, and the formed water was separated with a Dean-Stark trap. The solution was colled and partitioned between toluene and water. The organic layer was washed with water until neutral, dried over anhydrous $Na_2SO_4$, and distilled under vacuum (water jet pump). The solid brown residue (46.6 grams) was crystallized from petroleum ether 60° to 80° C. and had a melting point of 111° to 112° C.

U.V. in ethanol 95 percent
$\lambda$ max = 312 m$\mu$; $\epsilon$ = 10,600

To a solution of four grams of maleic acid dissolved in 30 milliliters of boiling ethanol is added a solution of 10 grams of N-[dibenzo(b,f)oxepin-10-yl]-N'-methylpiperazine in 50 milliliters of boiling ethanol. The hot solution was filtered and slowly added to 350 cc anhydrous ethyl ether and kept at 4° C. for four hours. The filtered precipitate was washed four times with 10 milliliters anhydrous ether and dried at room temperature at a pressure of 0.01 mm Hg. The obtained maleate acid addition salt in the form of white crystals had a melting point of 195° to 196° C. Yield: 13.2 grams.

U.V. in ethanol 95 percent
$\lambda$ max = 308 m$\mu$; $\epsilon$ = 10,300

This compound exhibited muscle relaxing, hypotensive activity, and reduced spontaneous motility in mice by the method of Dews as illustrated in the tables which follow the specific examples. Similarly, the pharmacological activities of various other compounds of the specific examples are shown in these tables.

EXAMPLE II

N-[8-Chloro-dibenzo(b,f)oxepin-10-yl]-N'-methylpiperazine 17.5 grams 8-Chloro-dibenzo(b,f)oxepin-1010(11H)-one (71.5 mmol)[1]([1] Known compound: See J. R. Geigy. A.-G. Neth. Patent 6508284 C.A. 64, 19574b (1966), 18 grams N-methylpiperazine (180 mmol), and 2.5 grams p-toluenesulfonic acid monohydrate were dissolved in 100 milliliters of anhydrous toluene.

The solution was refluxed for 73 hours, separating off the water with a Dean-Stark trap. The cooled solution was partitioned between toluene and water. The organic phase was washed with water until neutral, dried over anhydrous $Na_2SO_4$, and distilled under reduced pressure. The residue was crystallized from ethyl acetate yielding nine grams of white crystals with a melting point of 125° to 128° C.

U.V. in ethanol 95 percent
$\lambda$ max = 318 m$\mu$; $\epsilon$ = 9,000

The above-described compound (8.2 grams) was dissolved in 20 milliliters of boiling ethanol, and 2.9 grams of maleic acid dissolved in 10 milliliters of boiling ethanol were added. Ethyl ether was added to the solution until incipient crystallization (about 300 milliliters). The mixture was kept at 4° C. for four hours and then filtered. The residue was washed four times with 10 milliliters of anhydrous ethyl ether and dried under high vacuum, yielding 7.7 grams of white crystals of the maleate addition salt with a melting point of 184° to 187° C. (decomposition).

U.V. in ethanol 95 percent
$\lambda$ max = 301 m$\mu$; $\epsilon$ = 8,960

EXAMPLE III

N-[8-Methoxy-dibenzo(b,f)oxepin-10-yl]-N'-methylpiperazine 10.4 grams (43 mmol) 8-Methoxy-dibenzo(b,f)oxepin-10(11H)-one, 10.5 grams (105 mmol) N-methylpiperazine, and 1.2 grams p-toluenesulfonic acid monohydrate were dissolved in 100 milliliters of anhydrous toluene.

The solution was refluxed for 72 hours, separating the formed water with a Dean-Stark trap. The cooled solution was partitioned between toluene and water. The organic phase was washed with water until neutral, and then extracted with an 0.1 N aqueous solution of maleic acid. The aqueous phase was made alkaline with a saturated $NaHCO_3$ solution and extracted with ethyl ether. The organic phase was washed with water until neutral, dried over anhydrous $Na_2SO_4$, and then distilled. The residue (nine grams) was crystallized from methyl alcohol to yield nine grams of white crystals having a melting point of 141° to 143° C.

U.V. in ethanol 95 percent $\lambda$ max = 302 m$\mu$; $\epsilon$ = 11,780

N-[8-Methoxy-dibenzo(b,f)oxepin-10-yl]-N'-methyl-piperazine (3.8 grams) as prepared above was dissolved in 15 milliliters of boiling ethanol; then 1.3 grams of maleic acid dissolved in five milliliters of boiling ethanol were added. Anhydrous ethyl ether was added to the solution until incipient crystallization (about 150 cc). After four hours at 4° C., the precipitate was filtered off, washed four times with five milliliters of anhydrous ethyl ether, dried under high vacuum yielding 3.5 grams of white crystals of the maleate salt with a melting point of 199° C. (decomposition).

U.V. in ethanol 95 percent $\lambda$ max = 300 m$\mu$; $\epsilon$ = 12,500

EXAMPLE IV

N-[Dibenzo(b,f)oxepin-10-yl]-N'-ethylpiperazine 22 grams (104 mmol) Dibenzo(b,f)oxepin-10(11H)-one, 22 grams (192 mmol) N-ethylpiperazine, and 0.5 gram p-toluenesulfonic acid monohydrate were dissolved in 100 milliliters of anhydrous toluene.

The solution was refluxed for 66 hours; the formed water was separated off with a Dean-Stark trap. The cooled solution was partitioned between water and toluene. The organic phase was washed with water and toluene. The organic phase was washed with water until neutral; then extracted with 0.1 N aqueous solution of maleic acid. The acid solution was made alkaline with a saturated solution of $NaHCO_3$ and then re-extracted in ethyl ether.

The organic phase was washed with water until neutral, dried over anhydrous $Na_2SO_4$, and then distilled. The residue was crystallized from ethyl alcohol. Yield was 7.9 grams with a melting point of 113° to 115° C. (white crystals).

U.V. in ethanol 95 percent $\lambda$ max = 312 m$\mu$; $\epsilon$ = 10,450

N-[Dibenzo(b,f)oxepin-10-yl]-N'-ethylpiperazine (7.54 grams) was dissolved in 35 milliliters of boiling ethanol and 2.85 grams of maleic acid dissolved in 15 milliliters of boiling ethanol were added. The mixture was kept at 4° C. for 4 hours and then filtered. The precipitate was washed four times with 10 milliliters anhydrous ethyl ether and dried under high vacuum. Yield of maleate salt was 8.4 grams with a melting point of 180° C. (decomposition).

U.V. in ethanol 95 percent $\lambda$ max = 308 m$\mu$; $\epsilon$ = 10,100

EXAMPLE V

N-[Dibenzo(b,f)oxepin-10-yl]-N'-n-propylpiperazine 22 grams (104 mmol) Dibenzo(b,f)oxepin-10(11H)-one, 22 grams (172 mmol) N-n-propylpiperazine, and 0.6 gram p-toluenesulfonic acid monohydrate were dissolved in 100 milliliters of anhydrous toluene.

The solution was refluxed for 90 hours, separating off the water with a Dean-Stark trap. The cooled solution was partitioned between water and toluene. The organic phase was washed with water until neutral; the base was extracted with an 0.1 N maleic acid solution. The aqueous acid solution was made alkaline with a saturated $NaHCO_3$ solution and re-extracted with ether. The organic phase was washed with water until neutral, dried over anhydrous $Na_2SO_4$, and the solvent distilled off. The dark residue was crystallized from ethanol yielding 12.5 grams of white crystals with a melting point of 88° to 90° C.

U.V. in ethanol 95 percent $\lambda$ max = 312 m$\mu$; $\epsilon$ = 10,650

N-[Dibenzo(b,f)oxepin-10-yl]-N'-n-propyl-piperazine (11.8 grams) was dissolved in 60 milliliters of boiling ethanol and to this was added a solution of 3.81 grams of maleic acid dissolved in 25 milliliters of ethanol. Ethyl ether was added until incipient crystallization, and the mixture was allowed to stand at 4° C. for five hours. The precipitate was filtered off, and washed four times with 10 milliliters of ether. It was dried under high vacuum yielding 11.8 grams of compound with a melting point of 188° to 191° C. (white crystals).

U.V. in ethanol 95 percent $\lambda$ max = 308 m$\mu$; $\epsilon$ = 10,100

EXAMPLE VI

N-[Dibenzo(b,f)oxepin-10-yl]-N'-n-butylpiperazine 22 grams (104 mmol) Dibenzo(b,f)oxepin-10(11H)-one, 22 grams (155 mmol) N-n-butylpiperazine, and 0.6 gram p-toluenesulfonic acid monohydrate were dissolved in 100 ml anhydrous toluene.

The solution was refluxed for 72 hours, and the formed water separated off with a Dean-Stark trap. The cooled solution was partitioned between water and toluene. The organic phase was washed with water until neutral, and then extracted with an 0.1 N aqueous solution of maleic acid. The separated aqueous solution was made alkaline with a saturated solution of $NaHCO_3$ and re-extracted with ethyl ether. The organic phase was washed with water until neutral, dried over anhydrous $Na_2SO_4$, and distilled. The brown residue (18 grams) was crystallized from ethyl alcohol and had a melting point of 81° to 83° C. (white crystals).

U.V. in ethanol 95 percent $\lambda$ max = 312 m$\mu$; $\epsilon$ = 10,700

N-[Dibenzo(b,f)oxepin-10-yl]-N'-n-butylpiperazine (9.66 grams) was dissolved in 45 milliliters of boiling ethanol to which was added 3.35 grams of maleic acid dissolved in 25 milliliters of boiling ethanol. The mixture was kept four hours at 4° C. and then filtered. The precipitate was washed four times with 10 milliliters of anhydrous ethyl ether; then dried under high vacuum yielding 9.4 grams of white crystals with a melting point of 185° to 187° C. (decomposition).

U.V. in ethanol 95 percent
λ max = 308 mµ; ε = 10,200

EXAMPLE VII

N-[Dibenzo(b,f)oxepin-10-yl]-N'-carbethoxypiperazine 22 grams (104 mmol) Dibenzo(b,f)oxepin-10(11H)-one,
22 grams (138 mmol) N-carbethoxypiperazine, and
0.6 gram p-toluenesulfonic acid monohydrate are dissolved in
100 ml anhydrous toluene.

The solution was refluxed for 74 hours, separating off the water with a Dean-Stark trap. The cooled solution was partitioned between water and toluene. The organic phase was washed with water until neutral, dried over anhydrous $Na_2SO_4$, and the solvent distilled off. The residue was crystallized from methanol yielding 16 grams of white crystals with a melting point of 114° to 116° C.

U.V. in ethanol 95 percent
λ max = 309 mµ; ε = 10,350

EXAMPLE VIII

N-[Dibenzo(b,f)oxepin-10]-N'-phenylpiperazine 22 grams (104 mmol) Dibenzo(b,f)oxepin-10(11H)-one,
22 grams (135 mmol) N-phenylpiperazine, and
0.6 gram p-toluenesulfonic acid monohydrate were dissolved in
100 ml anhydrous toluene.

The solution was refluxed for 64 hours, separating off the water with a Dean-Stark trap. The cooled solution was partitioned between toluene and water. The organic phase was washed with water until neutral, dried over anhydrous $Na_2SO_4$, and distilled under reduced pressure. The residue was crystallized from ethyl acetate yielding 13 grams of white crystals with a melting point of 148° to 150° C.

U.V. in ethanol 95 percent
λ max = 308 mµ; ε = 10,700

EXAMPLE IX

N-[Dibenzo(b,f)oxepin-10-yl]-N'-benzylpiperazine 18 grams Dibenzo(b,f)oxepin-10(11H)-one (85.6 mmol),
18 grams N-benzylpiperazine (100.2 mmol), and
0.5 gram p-toluenesulfonic acid monohydrate were dissolved in 100 ml anhydrous toluene.

The solution was refluxed for 100 hours, separating off the water with a Dean-Stark trap. The cooled solution was partitioned between water and toluene. The organic layer was washed with water until neutral, dried over anhydrous $Na_2SO_4$, and the solvent evaporated at 15 mm Hg. The brown residue was crystallized from $CHCl_3$-ethanol obtaining 24.8 grams of white crystals with a melting point of 159° to 160° C.

U.V. in ethanol 95 percent
λ max = 312 mµ; ε = 10,400

EXAMPLE X

N-[Dibenzo(b,f)thiepin-10-yl]-N'-methylpiperazine

A mixture of
15 grams (66 mmol) dibenzo(b,f)thiepin-10(11H)-one[1]([1] J. O. Jilek et al., 96, 182, (1965),
30 grams (300 mmol) N-methylpiperazine, and
6 grams (34 mmol) N-methylpiperazine dihydrochloride was slightly refluxed for 48 hours. The excess N-methylpiperazine (about 10 cc) which contained the water formed during the reaction was distilled off. The cooled residue was partitioned between ethyl ether and a saturated solution of $NaHCO_3$. The organic phase was extracted two times with a saturated solution of $NaHCO_3$ and then with water until neutral. The organic phase was extracted with an 0.1 N aqueous solution of maleic acid. The acid solution was made alkaline with a saturated solution of $NaHCO_3$ and then extracted in ethyl ether.

This organic phase was washed with water until neutral, dried over anhydrous $Na_2SO_4$, and then distilled. The residue was crystallized from petroleum ether 60° to 80° C. yielding 10.4 grams of compound with a melting point of 115° to 117° C.

U.V. in ethanol 95 percent
λ max = 268 mµ; ε = 10,900
λ max = 307 mµ; ε = 8,150

To 7.9 grams of N-[dibenzo(b,f)thiepin-10-yl]-N'-methylpiperazine dissolved in 25 cc of boiling ethanol were added 2.97 grams of maleic acid dissolved in 10 cc of boiling ethanol. It was kept at 4° C. for four hours and then filtered. The precipitate was washed four times with 10 cc of anhydrous ethyl ether and dried under high vacuum. Yield of compound was 10 grams with a melting point of 213° C. (decomposition).

U.V. in ethanol 95 percent
λ max = 265 mµ; ε = 11,850
λ max = 301 mµ; ε = 7,950

EXAMPLE XI

N-[Dibenzo(b,f)thiepin-10-yl]-N'-n-propylpiperazine

A mixture of
22 grams (97.2 mmol) dibenzo(b,f)thiepin-10(11H)-one,
34 grams (245 mmol) N-n-propylpiperazine, and
16 grams (79.5 mmol) N-n-propylpiperazine dihydrochloride was slightly refluxed for 64 hours. The excess N-n-propyl-piperazine (about 15 cc) which contained water formed during the reaction was distilled off. The cooled residue was partitioned between ethyl ether and a saturated solution of $NaHCO_3$. The organic phase was washed two times with a saturated solution of $NaHCO_3$ and then with water until neutral. It was then extracted with an 0.1 N aqueous solution of maleic acid. The acid solution was made alkaline with $NaHCO_3$ (saturated solution) and extracted in ethyl ether. The organic phase was washed with water until neutral, dried over anhydrous $Na_2SO_4$, and distilled. The oil residue was chromatographed over neutral, activated $Al_2O_3$ (Activity Brockman I). The petroleum ether (boiling point 40° to 70° C.) - benzene (1:1) eluate was crystallized from petroleum ether (boiling point 40° to 70° C.) yielding 9.0 grams of compound in the form of white crystals with a melting point of 80° to 82° C.

U.V. in ethanol 95 percent

λ max = 268 mμ; ε = 10,400
λ max = 308 mμ; ε = 8,000

To 8.71 grams of the N-[dibenzo(b,f)thiepin-10-yl]-N'-n-propylpiperazine, prepared as described above, dissolved in 40 cc of boiling ethanol were added 3.00 grams of maleic acid dissolved in 10 cc of boiling ethanol. The formed salt was allowed to crystallize and was then filtered off. The precipitate was washed four times with 10 cc anhydrous ethyl ether, and then dried. White crystals (8.7 grams) with a melting point of 171° to 173° C. (decomposition) were obtained.

U.V. in ethanol 95 percent

λ max = 265 mμ; ε = 12,400
λ max = 302 mμ; ε = 8,300

EXAMPLE XII

N-[Dibenzo(b,f)thiepin-10-yl]-N'-iso-propylpiperazine

A mixture of 20 grams (88 mmol) dibenzo(b,f)thiepin-10(11H)-one,
27.7 grams (216 mmol) N-iso-propylpiperazine, and
7 grams (34 mmol) N-iso-propylpiperazine dihydrochloride was kept slightly boiling for 50 hours. The excess N-iso-propyl-piperazine (about 10 cc) which contained water formed during the reaction was distilled off. The cooled residue was partitioned between ethyl ether and a saturated solution of $NaHCO_3$. The organic phase was washed two times with a saturated solution of $NaHCO_3$, and then washed with water until neutral. The organic phase was extracted with an 0.1 N aqueous solution of maleic acid. The acid solution was made alkaline with a saturated solution of $NaHCO_3$ and extracted in ethyl ether. The organic phase was washed with water until neutral, dried over anhydrous $Na_2SO_4$, and distilled. The yield of compound was 3.2 grams with a melting point of 82° to 86° C. It was chromatographed over neutral, activated $Al_2O_3$ (Activity Brockman I); 2.27 grams were eluted with petroleum ether (boiling point 40° to 70° C.) - benzene (1:1) and crystallized from ethyl acetate; melting point was 83° to 85° C. (white crystals).

U.V. in ethanol 95 percent

λ max = 268 mμ; ε = 10,400
λ max = 308 mμ; ε = 8,000

To 0.685 gram of N-[dibenzo(b,f)thiepin-10-yl]-N'-iso-propylpiperazine dissolved in 3 cc boiling ethanol were added 0.236 gram maleic acid dissolved in 1.5 cc boiling ethanol. The formed salt was allowed to crystallize and was then filtered off. The precipitate was washed four times with 3 cc anhydrous ethyl ether and dried. It yielded 0.83 gram of compound in the form of white crystals with a melting point of 196° to 199° C.

U.V. in ethanol 95 percent

λ max = 265 mμ; ε = 12,200
λ max = 303 μ; ε = 8,200

EXAMPLE XIII

N-[Dibenzo(b,f)thiepin-10-yl]-N'-iso-butylpiperazine

A mixture of 20 grams (88 mmol) dibenzo(b,f)thiepin-10(11H)-one,
36 grams (253 mmol) N-iso-butylpiperazine, and
13 grams (60.4 mmol) N-iso-butylpiperazine dihydrochloride was gently boiled for 48 hours. Successively, 10 cc of N-iso-butylpiperazine which contained water formed during the reaction were distilled off. The cooled residue was partitioned between ethyl ether and a saturated solution of $NaHCO_3$. The organic phase was washed two times with a saturated solution of $NaHCO_3$ in water until neutral and then extracted with an 0.1 N solution of maleic acid. The acid solution was made alkaline with a saturated solution of $NaHCO_3$ and was extracted in ethyl ether. The organic phase was washed with water until neutral, dried over anhydrous $Na_2SO_4$, and distilled. The residue was crystallized from ethyl acetate yielding 10.2 grams of compound with a melting point of 94° to 96° C.

U.V. in ethanol 95 percent

λ max = 268 mμ; ε = 10,300
λ max = 308 mμ; ε = 8,000

To 9.84 grams of N-[dibenzo(b,f)thiepin-10-yl]-N'-iso-butylpiperazine dissolved in 30 cc boiling ethanol were added 3.25 grams of maleic acid dissolved in 10 cc of boiling ethanol. It was kept at 4° C. for four hours and then filtered. The precipitate was washed four times with 10 cc of anhydrous ethyl ether and dried under high vacuum. Yield of the compound in the form of white crystals was 12 grams with a melting point of 195° to 197° C. (decomposition).

U.V. in ethanol 95 percent

λ max = 265 mμ; ε = 11,650
λ max = 303 mμ; ε = 8,000

EXAMPLE XIV

N-[Dibenzo(b,f)thiepin-10-yl]-N'-benzylpiperazine

A mixture of 15 grams (66 mmol) dibenzo(b,f)thiepin-10(11H)-one,
49.7 grams (282 mmol) N-benzylpiperazine, and
8.2 grams (33 mmol) N-benzylpiperazine dihydrochloride was slightly refluxed for 48 hours. About 10 cc of N-benzylpiperazine which contained water formed during the reaction were distilled off. The cooled residue was partitioned between ethyl ether and a saturated solution of $NaHCO_3$ and then washed with water until neutral, dried over anhydrous $Na_2SO_4$, and the solvent distilled. The residue was crystallized from ethyl acetate yielding 11.2 grams of compound in the form of white crystals with a melting point of 137° to 139° C.

U.V. in ethanol 95 percent

λ max = 267 mμ; ε = 10,600
λ max = 305 mμ; ε = 8,150

EXAMPLE XV

N-[Dibenzo(b,f)thiepin-10-yl]-N'-carbethoxypiperazine

A mixture of
22 grams (97.2 mmol) dibenzo(b,f)thiepin-10(11H)-one,
29.3 grams (184.3 mmol) N-carbethoxypiperazine, and
9.5 grams (47.4 mmol) N-carbethoxypiperazine hydrochloride was slightly refluxed for 46 hours, allowing the water which was formed during the reaction to distill off, together with a part of N-carbethoxypiperazine. The cooled residue was partitioned between ethyl ether and a saturated solution of $NaHCO_3$. The organic phase was washed until neutral and dried over anhydrous $Na_2SO_4$. The solvent was distilled off. The solid residue was crystallized from ethyl acetate with a melting point of 105° to 108° C. The yield was 6.2 grams.

U.V. in ethanol 95 percent
$\lambda$ max = 267 m$\mu$; $\epsilon$ = 10,500
$\lambda$ max = 306 m$\mu$; $\epsilon$ = 7,900

EXAMPLE XVI

N-[8-Methyl-dibenzo(b,f)thiepin-10-yl]-N'-benzylpiperazine

A mixture of
12.4 grams (51 mmol) 8-methyl-dibenzo(b,f)thiepin-10(11H)-one[1] ([1] J. R. Geigy A.-G. Netherlands Patent 6,404,862 C.A. 62, 16215a (1965)),
30 grams (170 mmol) N-benzylpiperazine, and
7 grams (28 mmol) N-benzylpiperazine dihydrochloride was slightly refluxed for 48 hours. The water formed during the reaction was distilled off, collecting about 5 cc of distillate. The cooled residue was partitioned between ethyl ether and a saturated solution of $NaHCO_3$. The organic phase was washed two times with a saturated solution of $NaHCO_3$, washed with water until neutral, and then extracted with an 0.1 N aqueous solution of maleic acid. The acid solution was made alkaline with a saturated solution of $NaHCO_3$, and extracted in ethyl acetate. This organic solution was washed with water until neutral, dried over $Na_2SO_4$, and then distilled. The oily residue was crystallized from $CHCl_3$—MeOH (1:9) yielding 10.2 grams of the compound in the form of white crystals with a melting point of 128° to 131° C.

U.V. in ethanol 95 percent
$\lambda$ max = 264 m$\mu$; $\epsilon$ = 11,200
$\lambda$ max = 308 m$\mu$; $\epsilon$ = 8,600

EXAMPLE XVII

N-[8-Fluoro-dibenzo(b,f)oxepin-10-yl]-N'-methylpiperazine

A solution of
20 grams (87 mmol) 8-fluoro-dibenzo(b,f)oxepin-10(11H)-one,
25 grams (240 mmol) N-methylpiperazine, and
7 grams p-toluenesulfonic acid monohydrate were dissolved in 150 ml anhydrous toluene and refluxed for 70 hours, separating the formed water with a Dean-Stark trap. The cooled solution was partitioned between toluene and water. The organic phase was washed with water until neutral and then extracted with an 0.1 N aqueous solution of maleic acid. The aqueous phase was made alkaline with a saturated $NaHCO_3$ solution and extracted with ethyl ether. The organic phase was washed with water until neutral, dried over anhydrous $Na_2SO_4$, and distilled. The residue (20 grams) was crystallized from ethyl acetate and had a melting point of 135° to 138° C.

U.V. in ethanol 95 percent
$\lambda$ max = 295 m$\mu$; $\epsilon$ = 9,150
$\lambda$ max = 316 m$\mu$; $\epsilon$ = 9,200

To 12.32 grams (39.6 mmol) of N-[8-fluoro-dibenzo(b,f)-oxepin-10-yl]-N'-methylpiperazine dissolved in 50 milliliters of boiling ethanol were added 4.6 grams (39.6 mmol) maleic acid dissolved in 15 milliliters of boiling ethanol. It was allowed to stand for four hours at 4° C. The white crystals obtained were filtered off and washed with ethyl ether. Yield was 10.2 grams with a melting point of 172° C. (decomposition).

U.V. in ethanol 95 percent
$\lambda$ max = 293 m$\mu$; $\epsilon$ = 9,450

EXAMPLE XVIII

N-[Dibenzo(b,f)thiepin-5,5-dioxide-10-yl]-N'-methylpiperazine

To a solution of 7.14 grams (63.6 mmol) potassium tertiary butoxide in 150 milliliters of anhydrous tertiary butyl alcohol and 300 milliliters of anhydrous ethyl ether were added 62 grams (620 mmol) of N-methylpiperazine and 20 grams (62.2 mmol) 10-bromo-dibenzo(b,f)thiepin-5,5-dioxide[1] ([1] This compound has been prepared following the procedure described by W. Tochtermann, Knut Oppenländer und Michel Nguyen-Duong Hoang: Liebigs Ann. Chem. 701, 117 (1967). The solution was stirred 20 hours. It was poured into water and extracted with ethyl acetate. The organic phase was washed with water until neutral, and then extracted with an aqueous solution of 0.1 N maleic acid. The separated acidic solution was made alkaline with a saturated $NaHCO_3$ solution and extracted with ethyl acetate. The organic phase was washed with water until neutral, dried over anhydrous $Na_2SO_4$, and then distilled. The white crystalline residue was crystallized from 1,2-dichloroethane-ethyl acetate yielding 13 grams of compound with a melting point of 193° to 196° C.

U.V. in ethanol 95 percent
$\lambda$ max = 227 m$\mu$; $\epsilon$ = 37,400
$\lambda$ max = 322 m$\mu$; $\epsilon$ = 11,850

EXAMPLE XIX

N-[Dibenzo(b,f)thiepin-10-yl]-piperazine

A mixture of
5 grams (22.1 mmol) dibenzo(b,f)thiepin-10(11H)-one,
7 grams (81.3 mmol) piperazine, and
2.1 grams p-toluenesulfonic acid monohydrate in 100 ml anhydrous xylene was slightly refluxed for 28 hours. The solvent was distilled, and the cooled residue was partitioned between ethyl acetate and a saturated solution of $NaHCO_3$. The organic phase was washed with water until neutral, dried over anhydrous $Na_2SO_4$, and then distilled. The oily residue (6 grams) was chromatographed over neutral, activated $Al_2O_3$ (Activity Brockman I). The substance eluted with the benzene-ethyl ether (1:1) mixture (5.7 grams) was crystallized from ethyl ether and had a melting point of 134° C. (decomposition).

U.V. in ethanol 95 percent
λ max = 267 mμ; ε = 10,000
λ max = 307 mμ; ε = 7,700

EXAMPLE XX

N-[Dibenzo(b,f)thiepin-10-yl]-N'-(N-ethylacetamide)-piperazine

A mixture of
5.7 grams (18.6 mmol) N-[dibenzo(b,f)thiepin-10-yl]-piperazine,
2.6 grams (21.6 mmol) N-ethyl-2-chloroacetamide, and
12.3 grams (116 mmol) anhydrous Na₂CO₃ in 100 ml anhydrous benzene was refluxed for 24 hours. The cooled mixture was washed with water until neutral, dried over anhydrous Na₂SO₄, and the solvent distilled. The residue (Six grams) was crystallized from ethanol. It had a melting point of 150° to 152° C.

U.V. in ethanol 95 percent
λ max = 268 mμ; ε = 10,300
λ max = 307 mμ; ε = 8,000

EXAMPLE XXI

N-[8-Fluoro-dibenzo(b,f)oxepin-10-yl]-N'-benzylpiperazine

A solution of 20 g of 8-fluoro-dibenzo(b,f)oxepin-10(11H)- one, 40 g of N-benzylpiperazine and 6.5 of p-toluenesulfonic acid in 120 ml of toluene was refluxed 70 hours, separating off the water with a Dean-Stark trap. The cooled solution was extracted with a saturated NaHCO₃ solution, washed with water and dried over anhydrous Na₂SO₄. Evaporation of the solvent yielded 25 g of residue which was crystallized from ethylacetate and had a melting point of 137°-139° C.

U.V. in ethanol 95 percent
λ max = 297 mμ; ε = 8,800
λ max = 316 mμ; ε = 8,950

EXAMPLE XXII

N-[8-Fluoro-dibenzo(b,f)oxepin-10-yl]-N'-carbethoxypiperazine

A solution of 20 g of 8-fluoro-dibenzo(b,f)oxepin-10(11H)- one, 27 g of N-carbethoxypiperazine and 6 g of p-toluenesul-fonic acid in 120 ml of toluene was refluxed 70 hours, separating off the water with a Dean-Stark trap. The cooled solution was extracted with a saturated NaHCO₃ solution, washed with water and dried over anhydrous Na₂SO₄. Evaporation of the solvent and crystallization of the residue from ethylacetate gave 9.3 g of compound with a melting point of 120°-121° C.

U.V. in ethanol 95 percent
λ max = 293 mμ; ε = 9,170
λ max = 313 mμ; ε = 8,850

EXAMPLE XXIII

N-[8-Fluoro-dibenzo(b,f)oxepin-10-yl]-piperazine

A solution of 20 g of 8-fluoro-dibenzo(b,f)oxepin-10(11H)- one, 30 g of piperazine and 8.5 g of p-toluenesulfonic acid in 170 ml of toluene was refluxed 48 hours separating off the water with a Dean-Stark trap. The cooled mixture was extracted with a saturated NaHCO₃ solution, washed with water and dried over anhydrous Na₂SO₄. Evaporation of the solvent yielded 25 g of residue which was crystallized from ethanol and had a melting point of 119°-121° C.

U.V. in ethanol 95 percent
λ max = 296 mμ; ε = 8,800
λ max = 315 mμ; ε = 8,970

EXAMPLE XXIV

N-[8-Methoxy-dibenzo(b,f)oxepin-10-yl]-N'-benzylpiperazine

A solution of 20 g of 8-methoxy-dibenzo(b,f)oxepin-10-(11H)-one, 29.3 g of N-benzylpiperazine and 6 g of p-toluene-sulfonic acid in 120 ml of toluene was refluxed 48 hours, separating off the water with a Dean-Stark trap. The cooled solution was treated with a saturated NaHCO₃ solution, washed with water and dried over anhydrous Na₂SO₄. Evaporation of the solvent and crystallization from CHCl₃-ethanol gave 17.6 g of white crystals with a melting point of 138°-139° C.

U.V. in ethanol 95 percent
λ max = 303 mμ; ε = 11,700

EXAMPLE XXV

N-[8-Fluoro-dibenzo(b,f)oxepin-10-yl]-N'-phenylpiperazine

A solution of 20 g of 8-fluoro-dibenzo(b,f)oxepin-10- (11H)-one, 28.4 g of N-phenylpiperazine and 6 g of p-toluene-sulfonic acid in 120 ml of toluene was refluxed 48 hours, separating off the water with a Dean-Stark trap. The cooled solution was washed with water and dried over anhydrous Na₂SO₄. Evaporation of the solvent and crystallization of the residue from ethylacetate gave 12.3 g of white crystals with melting point of 147°-148° C.

U.V. in ethanol 95 percent
λ max = 294 mμ; ε = 11,200

EXAMPLE XXVI

N-[8-Fluoro-dibenzo(b,f)oxepin-10-yl]-N'-(N,N-dimethylacetamide)-piperazine

To a solution of 6.9 g of N-[8-fluoro-dibenzo(b,f)oxepin-10-yl]-piperazine in 60 ml of anhydrous benzene, 1.48 g of anhydrous Na₂CO₃ and 3.11 g of N,N-dimethylchloroacetamide were added under stirring. After refluxing 20 hours the solution was cooled, washed with water and dried over anhydrous Na₂SO₄. Evaporation of the solvent yielded 7.9 g of residue which was crystallized from methanol and had a melting point of 146-148°C.

U.V. in ethanol 95 percent
λ max = 295 mμ; ε = 18,100
λ max = 315 mμ; ε = 18,300

EXAMPLE XXVII

N-[8-Chloro-dibenzo(b,f)oxepin-10-yl]-N'-phenylpiperazine

A solution of 25 g of 8-chloro-dibenzo(b,f)oxepin-10(11H)-one, 33.5 g of N-phenylpiperazine and 5 g of p-toluenesulfonic acid in 150 ml of toluene was refluxed 48 hours, separating off the water with a Dean-Stark trap. The cooled solution was extracted with a saturated NaHCO$_3$ solution, washed with water and dried over anhydrous Na$_2$SO$_4$. Evaporation of the solvent and crystallization from ethylacetate yielded 21.3 g of white crystals with a melting point of 169°–170° C.

U.V. in ethanol 95 percent
λ max = 302 mµ; ε = 9,950

EXAMPLE XXVIII

N-[8-Chloro-dibenzo(b,f)oxepin-10-yl]-piperazine

A mixture of 60 g of 8-chloro-dibenzo(b,f)oxepin-10(11H)- one, 84.5 g of piperazine, 10 g of p-toluenesulfonic acid, separating off the water with a Dean-Stark trap. The cooled solution was treated with a saturated NaHCO$_3$ solution, washed with water and dried over anhydrous Na$_2$SO$_4$. Evaporation of the solvent and crystallization of the residue from benzene yielded 58 g of white crystals with a melting point of 180°-182°C.

U.V. in ethanol 95 percent
λ max = 316 mµ; ε = 8,850

EXAMPLE XXIX

N-[8-Chloro-dibenzo(b,f)oxepin-10-yl]-N'-benzylpiperazine

A solution of 25 g of 8-chloro-dibenzo(b,f)oxepin-10-(11H)-one, 16.3 g of N-benzylpiperazine and 5 g of p-toluene-sulfonic acid in 150 ml of toluene was refluxed 48 hours, separating off the water with a Dean-Stark trap. The cooled solution was treated with a saturated NaHCO$_3$ solution, washed with water and dried over anhydrous Na$_2$SO$_4$. Evaporation of the solvent and crystallization of the residue from ethylacetate yielded 18 g of white crystals with a melting point of 113.5°–117° C.

U.V. in ethanol 95 percent
λ max = 316 mµ; ε = 8,950

EXAMPLE XXX

N-[8-Chloro-dibenzo(b,f)oxepin-10-yl]-N'-carbethoxypiperazine

A solution of 20 g of 8-chloro-dibenzo(b,f)oxepin-10-(11H)-one, 26 g of N-carbethoxypiperazine and 6 g of p-toluene-sulfonic acid in 150 ml of toluene was refluxed 48 hours, separating off the water with a Dean-Stark trap. The cooled solution was treated with a saturated NaHCO$_3$ solution, washed with water and dried over anhydrous Na$_2$SO$_4$. Evaporation of the solvent gave 18 g of residue which was crystallized from CHCl$_3$-methanol and had a melting point of 125°–127° C.

U.V. in ethanol 95 percent
λ max = 316 mµ; ε = 9,120

EXAMPLE XXXI

N-[8-Chloro-dibenzo(b,f)oxepin-10-yl]-N'-(2-methyl-benzyl)-piperazine

A mixture of 7.4 g of 8-chloro-dibenzo(b,f)oxepin-10(11H)-one, 11 g of N-(2-methyl-benzyl)-piperazIne and 3 g of p-toluenesulfonic acid in 100 ml of toluene was refluxed 48 hours, separating the water with a Dean-Stark trap. The cooled solution was treated with a saturated NaHCO$_3$ solution, washed with water and dried over anhydrous Na$_2$SO$_4$. Evaporation of the solvent and crystallization from ethylacetate yielded 3.5 g of compound with a melting point of 142°–144° C.

U.V. in ethanol 95 percent
λ max = 316 mµ; ε = 8,500

EXAMPLE XXXII

N-[8-Chloro-dibenzo(b,f)oxepin-10-yl]-N'-(4-methoxybenzyl)-piperazine

A mixture of 14.5 g of N-[8-chloro-dibenzo(b,f)oxepin-10-yl]-piperazine, 2.86 g of Na$_2$CO$_3$, 7.98 g of 4-methoxybenzyl-chloride in 160 ml of benzene was refluxed 20 hours. The cooled mixture was treated with water, washed until neutral with water and dried over anhydrous Na$_2$SO$_4$. The solvent was evaporated. The residue was crystallized from ethylacetate by filtrating off the insoluble matter and 5 g of the product were obtained with a melting point of 120°–121° C.

U.V. in ethanol 95 percent
λ max = 320 mµ; ε = 8,900

EXAMPLE XXXIII

N-[8-chloro-dibenzo(b,f)oxepin-10-yl]-N'-(3-pyridylmethyl)-piperazine

A mixture of 12.8 g of N-[8-chloro-dibenzo(b,f)oxepin-10-yl]-piperazine, 15 g of Na$_2$CO$_3$ and 8.2 g of 3-chloromethyl-pyridine-hydrochloride in 150 ml of benzene and 220 ml of ethanol was refluxed six hours. After cooling, water was added. The organic layer was washed with water until neutral and dried over anhydrous Na$_2$SO$_4$. Evaporation of the solvent yielded 13 g of residue which was crystallized from CHCl$_3$—ethanol and had a melting point of 140–141° C.

U.V. in ethanol 95 percent
λ max = 320 mµ; ε = 9,150

EXAMPLE XXXIV

N-[8-Chloro-dibenzo(b,f)oxepin-10-yl]-N'-phenylethylpiperazine

A mixture of 10 g of N-[8-chloro-dibenzo(b,f)oxepin-10-yl]-piperazine, 2.3 g of Na$_2$CO$_3$ and 6.6 g of 2-bromoethyl benzene in 180 ml of benzene was refluxed 20 hours. Water was added to the cooled mixture. The organic layer was washed with water and dried over anhydrous Na$_2$SO$_4$. Evaporation of the solvent and crystallization from ethylacetate yielded 7.5 g of white crystals with a melting point of 159°–161° C.

U.V. in ethanol 95 percent
λ max = 320 mµ; ε = 9,550

EXAMPLE XXXV

N-[8-Chloro-dibenzo(b,f)oxepin-10-yl]-N'-(2-chloro-benzyl)-piperazine

To a refluxing mixture of 10 g of N-[8-chloro-dibenzo-(b,f)oxepin-10-yl]-piperazine and 2.3 g of $Na_2CO_3$ in 150 ml of benzene, 5.8 g of 2-chloro-benzyl-chloride were added. After refluxing 20 hours the mixture was cooled, water was added, the organic layer was washed with water until neutral and dried over anhydrous $Na_2SO_4$. Evaporation of the solvent yielded 12.8 g of residue which was crystallized from ethylacetate and had a melting point of 164°–167° C.

U.V. in ethanol 95 percent
$\lambda$ max = 320 m$\mu$; $\epsilon$ = 9,550

EXAMPLE XXXVI

N-[6-Chloro-dibenzo(b,f)oxepin-10 yl]-N'-methyl-piperazine

A solution of 15 g of 6-chloro-dibenzo(b,f)oxepin-10-(11H)-one (Preparation A, hereinafter), 15 g of N-methylpiperazine and 4 g of p-toluenesulfonic acid in 160 ml of toluene was refluxed 48 hours separating off the water with a Dean-Stark trap. The cooled solution was treated with a saturated $NaHCO_3$ solution, washed with water and extracted with 0.1 N maleic acid and the acidic layer was made alkaline with 10 percent $Na_2CO_3$ and extracted with ethyl ether. The ethereal phase was washed with water and dried over anhydrous $Na_2SO_4$. Evaporation of the solvent yielded 10.6 g of residue which was crystallized from ethylacetate and had a melting point of 97°–99° C.

U.V. in ethanol 95 percent
$\lambda$ max = 310 m$\mu$; $\epsilon$ = 9,400

EXAMPLE XXXVII

N-[6-Chloro-dibenzo(b,f)oxepin-10-yl]-piperazine

A mixture of 30 g of 6-chloro-dibenzo(b,f)oxepin-10-(11H)-one (preparation A, hereinafter), 30 g of piperazine and 7 g of p-toluenesulfonic acid in 300 ml of toluene was refluxed 48 hours, separating the water with a Dean-Stark trap. The cooled mixture was treated with a saturated $NaHCO_3$ solution, washed with water and dried over anhydrous $Na_2SO_4$. Evaporation of the solvent and crystallization from ethyl-acetate yielded 17 g of white crystals with a melting point of 146°–148° C.

U.V. in ethanol 95 percent
$\lambda$ max = 315 m$\mu$; $\epsilon$ = 9,600

EXAMPLE XXXVIII

N-[6-Chloro-dibenzo(b,f)oxepin-10-yl]-N'-(2-pyridinomethyl)-piperazine

To a refluxing mixture of 11 g of N-[6-Chloro-dibenzo(b,f)-oxepin-10-yl]-piperazine and 12.88 g of $Na_2CO_3$ in 50 ml of benzene and 50 ml of ethanol, 7.04 g of 2-chloromethylpyridine hydrochloride in 50 ml of ethanol were added. After refluxing 20 hours the mixture was cooled, water was added and the organic layer was washed with water until neutral. After drying over anhydrous $Na_2SO_4$, the solvent was evaporated and the residue was crystallized from ethylacetate yielding 8 g of white crystals with a melting point of 121°–123° C.

U.V. in ethanol 95 percent
$\lambda$ max = 254 m$\mu$; $\epsilon$ = 12,100
$\lambda$ max = 315 m$\mu$; $\epsilon$ = 9,750

EXAMPLE XXXIX

N-[8-Fluoro-dibenzo(b,f)oxepin-10-yl]-N'-(N-n-propyl-2-methyl-acetamide)-piperazine 2.16 g N-n-propyl-2-chloropropionamide dissolved in 30 ml anhydrous benzene were slowly added to a stirred mixture of 10 grams N-[8-fluoro-dibenzo(b,f)oxepin-10-yl]piperazine, 1.6 g anhydrous $Na_2CO_3$, 120 ml anhydrous benzene. The mixture was refluxed under stirring for 20 hours and then cooled in an ice-bath. Water was added and the benzenic solution was washed with water and dried over anhydrous $Na_2SO_4$. The solvent was distilled off under vacuum and the residue was crystallized from ethanol separating off the insoluble matter. 5.2 g of compound were obtained with a melting point of 155°–156° C.

U.V. in ethanol 95 percent
$\lambda$ max = 295 m$\mu$; $\epsilon$ = 9,050
$\lambda$max = 315 m$\mu$; $\epsilon$ = 9,170

EXAMPLE XL

N-[8-fluoro-dibenzo(b,f)oxepin-10-yl]-N'-(N,N-diethyl-2-methyl-acetamide)-piperazine 5.61 g N,N-diethyl-2-chloropropionamide dissolved in 60 ml anhydrous benzene were slowly added to a mixture of 15 g N-[8-fluoro-dibenzo(b,f)oxepin-10-yl]-piperazine, 2.12 g anhydrous $Na_2CO_3$ and 180 ml anhydrous benzene. The mixture was refluxed for 20 hours with stirring and then cooled in an ice-bath. Water was added and the mixture was shaken enough. The benzene layer was washed with water and dried over $Na_2SO_4$. The solvent was distilled off under vacuum. The residue was crystallized from ethanol, separating off the insoluble matter. 3.25 g of obtained compound had a melting point of 165°–166° C.

U.V. in ethanol 95 percent
$\lambda$ max = 295 m$\mu$; $\epsilon$ = 8,850
$\lambda$ max = 315 m$\mu$; $\epsilon$ = 9,000

EXAMPLE XLI

N-[8-fluoro-dibenzo(b,f)oxepin-10-yl]-N'-(N-ethylacetamide)-piperazine 3.05 g N-ethyl-chloroacetamide dissolved in 50 ml anhydrous benzene were slowly added to a boiling mixture of 15 g N-[8-Fluoro-dibenzo(b,f)oxepin-10-yl]-piperazine, 2.12 g anhydrous $Na_2CO_3$ and 180 ml anhydrous benzene. The mixture was refluxed for 20 hours with stirring and then cooled in an ice-bath. Water was added and the mixture was shaken enough. The benzene layer was washed with water and dried over anhydrous $Na_2SO_4$. The solvent was distilled off under vacuum and the residue crystallized from chloroform-ethanol. The compound (8.9 g) had a melting point of 190°–191° C.

U.V. ethanol 95 percent
$\lambda$ max = 295 m$\mu$; $\epsilon$ = 9,050
$\lambda$ max = 313 m$\mu$; $\epsilon$ = 9,150

PREPARATION OF STARTING MATERIALS

Preparation A 6-chloro-dibenzo(b,f)oxepin-10(11H)-one

A mixture of 222 g of 2-(2-chlorophenoxy)-phenylacetic acid in 2200 ml of polyphosphoric acid was stirred, under $N_2$, three hours at 120° C. The cooled mixture was poured into ice-water and extracted with ethyl ether. The ethereal phase was extracted with 10 percent $Na_2CO_3$, washed with water and dried over anhydrous $Na_2SO_4$. Evaporation of the solvent yielded 180 g of residue which was distilled and had a boiling point of 168° C. (0.01 mm Hg) and a melting point of 83°–84 C. (from methanol).

U.V. in ethanol 95 percent
$\lambda$ max $= 249$ m$\mu$; $\epsilon = 8,050$
$\lambda$ max $= 309$ m$\mu$; $\epsilon = 2,700$

PREPARATION B 2-(2-Chlorophenoxy)-phenylacetic acid

A mixture of 325.5 g of 2-(2chlorophenoxy)-acetophenone, 71.2 g of sulfur and 184 ml of morpholine was refluxed nine hours. The cooled mixture was partitioned between benzene and N HCl. The organic layer was washed with water and dried over anhydrous $Na_2SO_4$. Evaporation of the solvent yielded 486 g of residue which was dissolved in 1200 ml of acetic acid, 455 ml of 96 percent $H_2SO_4$ and 655 ml of water. The solution was refluxed 20 hours. After cooling the solution was poured over ice-water and the precipitate was collected and dissolved in benzene. The solution was extracted with 10 percent $Na_2CO_3$. The alkaline solution was acidified with 6N HCl and extracted with ethyl ether. The ethereal phase was washed with water and dried over anhydrous $Na_2SO_4$. Evaporation of the solvent yielded 254 g of residue which was crystallized from ethylacetate and had a melting point of 114°–116° C.

U.V. in ethanol 95 percent
$\lambda$ max $= 270$ m$\mu$; $\epsilon = 1,790$

PREPARATION C 2-(2-Chlorophenoxy)-acetophenone

To a solution of 160 g of 85% KOH in 800 ml of ethanol, 293 g of o-chlorophenol were added. The solvent was evaporated and to the residue, 293 g of o-chlorophenol, 352 g of o-chloroacetophenone and 37.7 g of copper powder were added. The mixture was stirred under $N_2$ five hours at 150° C. After cooling, the mixture was dissolved in ethyl ether, extracted with 2N NaOH, washed with water and dried over anhydrous $Na_2SO_4$. Evaporation of the solvent and distillation of the residue yielded 351 g of compound with boiling point 201° C./20 mm Hg and melting point 43°–45° C. (from petroleum ether 40°–70°).

U.V. in ethanol 95 percent
$\lambda$ max $= 240$ m$\mu$; $\epsilon = 10,400$
$\lambda$ max $= 296$ m$\mu$; $\epsilon = 3,300$ The pharmacological activity of the several different compounds described above will be shown in the following tables.

TABLE 1

Spontaneous Motility (Mouse)
Method: Dews
Administration Route: per os
Dose: 1/5 $LD_{50}$

| Compound of | % Reduction of Passages |
|---|---|
| Example I | −98 |
| Example II | −87 |
| Example III | −99 |
| Example IV | −78 |
| Example V | −100 |
| Example VI | −100 |
| Example VII | −81 |
| Example VIII | −84 |
| Example X | −99 |
| Example XI | −95 |
| Example XIII | −97 |
| Example XXII | −84 |
| Example XXIII | −91 |
| Example XXIV | −45 |
| Example XXV | −76 |
| Example XXVI | −99 |
| Example XXVIII | −98 |
| Example XXIX | −91 |
| Example XXX | −72 |
| Example XXI | −76 |
| Example XXXII | −50 |
| Example XXXIII | −99 |
| Example XXXVI | −94 |
| Example XXXVII | −90 |
| Example XXXVIII | −54 |
| Example XXXIX | −91 |
| Example XL | −97 |
| Example XLI | −95 |

TABLE 2

Hypotensive Activity (Rat)
Administration Route: per os
Dose: 1/5 $LD_{50}$

| Compound of | % Pressure Modification |
|---|---|
| Example I | −40 (Cat) |
| Example III | −52 |
| Example IV | −21 |
| Example V | −20 |
| Example VI | −27 |
| Example X | −40 |
| Example XI | −14 |
| Example XIII | −29 |
| Example XXIII | −26 |
| Example XXVI | −33 |
| Example XXVIII | −16 |
| Example XXX | −16 |
| Example XXXI | −14 |
| Example XXXVI | −36 |
| Example XXXVII | −21 |
| Example XXXVIII | −14 |
| Example XXXIX | −17 |

TABLE 3

Anti-inflammatory Activity (Rat)
Method: Carrageenan oedema
Administration Route: per os
Dose: 1/5 $LD_{50}$

| Compound of | % Reduction of Oedema |
|---|---|
| Example II | −62 |
| Example III | −57 |
| Example IV | −59 |
| Example X | −58 |
| Example XI | −73 |
| Example XIII | −66 |
| Example XV | −64 |
| Example XVI | −50 |
| Example XXI | −61 |
| Example XXII | −44 |
| Example XXIII | −79 |
| Example XXVI | −63 |
| Example XXVII | −69 |
| Example XXXIII | −82 |
| Example XXXVI | −80 |
| Example XXXVII | −34 |
| Example XXXVIII | −70 |

TABLE 4

Hypothermia (Rat)
Administration Route: per os
Dose: 1/5 $LD_{50}$

| Compound of | Mod. Body Temp. |
|---|---|

| Example | °C after (time) |
|---|---|
| Example II | −1.0 |
| Example IV | −1.5 |
| Example V | −2.2 (3 Hours) |
| Example VI | −1.6 (2 Hours) |
| Example VII | −1.5 |
| Example XVI | −1.7 (3 Hours) |

TABLE 5

Analgesic Activity (Mouse)
Method: Hot Plate
Administration Route: per os
Dose: 1/5 LD$_{50}$

| Compound of | % Time Modification |
|---|---|
| Example II | +320 |
| Example III | +234 |
| Example IV | +297 |
| Example VI | +240 |
| Example VII | +344 |
| Example X | +261 |
| Example XI | +304 |
| Example XIII | +279 |
| Example XV | +328 |
| Example XVI | +317 |
| Example XXI | 186 |
| Example XXII | +213 |
| Example XXIII | +228 |
| Example XXVI | +508 |
| Example XXVII | +375 |
| Example XXXII | +159 |
| Example XXXIII | +136 |
| Example XXXVI | +374 |
| Example XXXVII | +175 |
| Example XXXVIII | +288 |

TABLE 6

Myorelaxing Activity (Mouse)
Administration Route: per os
Dose: 1/5 LD$_{50}$

| Compound of | % of Fallen Animals |
|---|---|
| Example I | 60 |
| Example III | 100 |
| Example IV | 100 |
| Example V | 80 |
| Example VI | 100 |
| Example X | 100 |
| Example XI | 100 |
| Example XIII | 100 |
| Example XXIII | 100 |
| Example XXVI | 100 |
| Example XXVIII | 100 |
| Example XXXIII | 100 |
| Example XXXVI | 100 |
| Example XXXVII | 100 |
| Example XXXIX | 100 |
| Example XL | 100 |
| Example XLI | 100 |

We claim:
1. A compound having the formula

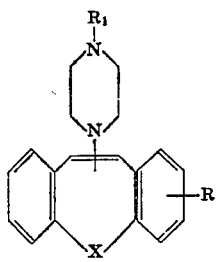

in which X is-O, or-S; R is hydrogen, halogen, lower alkoxy, lower alkyl, amino, mono(lower)-alkylamino, di(lower)alkylamino, or trifluoromethyl; and R$_1$ is hydrogen, lower alkyl, phenyl, benzyl, benzoyl, carb(lower)alkoxy, carb(lower)alkoxy(lower)-alkyl, phenacyl, (lower)alkylacetamide, di(lower)alkylacetamide, (lower)alkylcarboxamide, phenylcarboxamide, halophenylcarboxamide, phenylthiocarboxamide, cyanoethyl, picolyl, or di(lower)alkylamino(lower)alkyl; and the pharmacologically acceptable acid addition, oxonium and sulfonium salts thereof.

2. The compound of claim 1 which is N-[8-Chloro-dibenzo-(b,f)oxepin-10-yl]-N'-methylpiperazine.

3. The compound of claim 1 which is N-[8-Methoxy-dibenzo-(b,f)oxepin-10-yl]-N'-methylpiperazine.

4. The compound of claim 1 which is N-[8-Fluoro-dibenzo-(b,f)oxepin-10-yl]-N'-methylpiperazine.

5. The compound of claim 1 which is N-[Dibenzo(b,f)-oxepin-10-yl]-N'-methylpiperazine.

6. The compound of claim 1 which is N-[Dibenzo(b,f)-thiepin-10-yl]-N'-methylpiperazine.

7. The compound of claim 1 which is N-[Dibenzo(b,f)-oxepin-10-yl]-N'-phenylpiperazine.

8. The compound of claim 1 which is N-[Dibenzo(b,f)-thiepin-10-yl]-N'-benzylpiperazine.

9. The compound of claim 1 which is N-[Dibenzo(b,f)-thiepin-5,5-dioxide-10-yl]-N'-methylpiperazine.

10. A compound of claim 1 having the formula

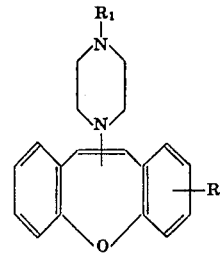

in which R is hydrogen, halogen, lower alkoxy, lower alkyl, amino, nitro, mono-lower)alkylamino, di(lower)alkylamino, or trifluoromethyl; and R$_1$ is hydrogen, lower alkyl, phenyl, benzyl, benzoyl, carb(lower)alkoxy, carb(lower)alkoxy(lower)-alkyl, phenacyl, (lower)alkylacetamide, di(lower)alkylacetamide, (lower)alkylcarboxamide, phenylcarboxamide, halophenylcarboxamide, phenylthiocarboxamide, cyanoethyl, picolyl, or di(lower)alkylamino(lower)alkyl.

11. A compound of claim 1 having the formula

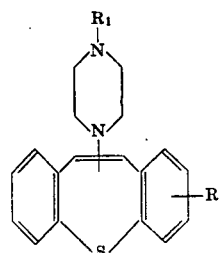

in which R is hydrogen, halogen, lower alkoxy, lower alkyl, amino, nitro, mono(lower)alkylamino, di(lower)alkylamino, or trifluoromethyl; and R$_1$ is hydrogen, lower alkyl, phenyl, benzyl, benzoyl, carb(lower)alkoxy, carb(lower)alkoxy(lower)-alkyl, phenacyl, (lower)alkylacetamide, di(lower)alkylacetamide, (lower)alkylcarboxamide, phenylcarboxamide, halophenylcarboxamide, phenylthiocarboxamide, cyanoethyl, picolyl, or di(lower)alkylamino(lower)alkyl.

12. A compound of claim 1 wherein $R_1$ is methyl and R is 8-chloro.

* * * * *

UNITED STATES PATENT OFFICE
CERTIFICATE OF CORRECTION

PATENT NO. : 3,681,354
DATED : August 1, 1972
INVENTOR(S) : Michele Mastursi, Sabino Lembo and Rene Viterbo It is certified that error appears in the above-identified patent and that said Letters Patent are hereby corrected as shown below:

Column 3, line 62, "colled" should read "cooled". Column 4, line 29, "1010(11H)" should read "10(11H)". Column 8, line 11, "(J.O. Jilek et al., 96, 182 (1965)" should read "(J.O. Jilek et al.,M.H. Chem. 96, 182 (1965)"; line 67, "The oil residue" should read "The oily residue". Column 10, line 2, "$\lambda$ max = 303 $\mu$" should read "$\lambda$ max = 303 m$\mu$. Column 13, line 36, "and 6.5 of" should read "and 6.5 g of". Column 15, line 15, "169°-170°C." should read "169-170°C.". Column 20, line 20, "Example XXI" should read "Example XXXI".

Signed and Sealed this eighteenth Day of November 1975

[SEAL]

Attest:

RUTH C. MASON
Attesting Officer

C. MARSHALL DANN
Commissioner of Patents and Trademarks